United States Patent [19]

McGuire et al.

[11] 4,060,664
[45] Nov. 29, 1977

[54] BONDED COMPOSITE STRUCTURES

[75] Inventors: Thomas M. McGuire, Woodbury; Kenneth Peacock, White Bear Lake, both of Minn.

[73] Assignee: Minnesota Mining and Manufacturing Company, Saint Paul, Minn.

[21] Appl. No.: 638,451

[22] Filed: Dec. 8, 1975

[51] Int. Cl.² ............................................. B32B 27/04
[52] U.S. Cl. .................................... 428/336; 156/331; 427/40; 428/339; 428/354; 428/355; 428/474; 428/480
[58] Field of Search .............. 428/336, 339, 343, 354, 428/355, 474, 480, 500, 524, 521; 427/39, 40, 41; 156/331

[56] References Cited

U.S. PATENT DOCUMENTS

| 2,039,284 | 5/1936 | Hartzell | 428/354 X |
|---|---|---|---|
| 2,430,479 | 11/1947 | Pratt et al. | 154/140 |
| 2,607,709 | 8/1952 | Simpson et al. | 428/355 X |
| 2,941,983 | 6/1960 | Smeltz | 260/77.5 |
| 3,198,692 | 8/1965 | Bridgeford | 156/331 X |
| 3,257,228 | 6/1966 | Reed | 428/354 X |
| 3,416,994 | 12/1968 | Chalmers et al. | 156/331 X |
| 3,661,623 | 5/1972 | Bhakuni et al. | 156/330 X |
| 3,821,017 | 6/1974 | Bhakuni et al. | 156/331 X |
| 3,929,733 | 12/1975 | Alberino et al. | 260/77.5 R |

Primary Examiner—Thomas J. Herbert, Jr.
Assistant Examiner—Bruce H. Hess
Attorney, Agent, or Firm—Cruzan Alexander; Donald M. Sell; Warren R. Bovee

[57] ABSTRACT

Bonded composite structures having improved bonding materials comprising a thin zone of polycarbodiimide polymer. Methods of preparing the bonded structures are described.

12 Claims, No Drawings

BONDED COMPOSITE STRUCTURES

The present invention relates to bonded composite structures comprising improved bonding materials. The bonding materials used in the present invention comprise organic polymers containing carbodiimide groups. Exemplary bonded structures comprise a variety of solid materials which can be in the form of rigid or flexible sheets or films, particles, fibers, or the like and combinations thereof. Methods of making bonded, composite structures are described.

Many methods have been used to bond substrates and increase the bond between adhesives and the substrates to which they are applied or on which they are carried. Mechanical means, such as abrading or etching the surface of the substrate to which an adhesive is applied, have been used to increase the surface area for, and thereby improve, adhesion. This method is often unsatisfactory in that an additional processing step is necessary and the mechanical treatment may adversely affect the substrate.

Priming the unmodified surface of substrates with chemical primers has also been used to improve adhesive bonds to substrates and has in many cases significantly improved the adhesion to various substrates. However, certain types of substrates are inherently reluctant to accept and adhere to various adhesive materials and known priming techniques are able to improve adhesion to these substrates only marginally or not at all. Many polyester substrates are particularly difficult to adhere to many materials. In view of the wide utility of polyester polymers, various methods, such as corona treating and chemical priming, have been used in an attempt to improve adhesion thereto with only limited success, particularly in applications where high bond strength is required and/or severe environmental factors are encountered.

The present invention provides means for improving the adhesive bond between a pair of solid materials by employing a particular, thin polymer zone in the bonding material. The zone consists essentially of a polymer containing at least two carbodiimide groups, each linked directly to an aromatic nucleus. The bonding material may consist of the carbodiimide-containing polymer zone alone or the carbodiimide-containing polymer zone in combination with other adhesive bonding materials. While not clearly understood, it has been found that polymers or monomers containing a single carbodiimide group do not function satisfactorily as adhesive bonding materials or as "primers" for adhesives, while thin zones of polymers containing at least two carbodiimide groups linked to at least one aromatic nucleus are superior adhesive bonding materials. As used herein, the term "primer" is used to refer to materials used in combination with known adhesive materials to improve or enhance the bond between these adhesive materials, whereas the term "adhesive" is used to refer to materials which will bond together materials which have no adhesive affinity for each other.

More particularly, the present invention relates to improved bonded, composite structures comprising one or more substrates having a solid material adhered thereto by an improved bonding material interposed between the substrate and the solid material. The bonding material of the present invention comprises a thin polymer zone consisting essentially of an organic polymer containing at least two carbodiimide groups, $-N=C=N-$. Each of the carbodiimide groups is linked directly to at least one aromatic nucleus through a carbodiimide nitrogen. Thus, the polymer contains groups which can be conveniently represented by the structural formulae $-N=C=N-Ar-$, $-Ar-N=C=N-Ar-$, or $-N=C=N-Ar-N=C=N-$ wherein Ar is an aromatic nucleus which can be a monocyclic or polycyclic aromatic nucleus. The organic polymer contains about 1 to about 35 weight percent carbodiimide groups, preferably about 24 to 31 weight percent and most preferably about 30 weight percent carbodiimide groups. The thin polymer zone can be up to about 500 Angstroms thick, but is preferably less than 100 Angstroms thick and is most preferably a molecular monolayer of the organic carbodiimide-containing polymer.

One aspect of the invention relates to a composite structure comprising an adhesive-receptive substrate and a solid material adhered thereto by a bonding material comprising a complementary adhesive for the substrate and, interposed between the complementary adhesive and the substrate, a thin polymer zone consisting essentially of the aforementioned carbodiimide-containing polymer.

Another aspect of the invention relates to bonded, composite structures comprising at least one substrate having a solid material adhered thereto by a bonding material wherein the bonding material consists essentially of a thin zone of the aforementioned carbodiimide-containing polymer. The solid material adhered to the substrate may be a complementary adhesive for the substrate or may be a material which has no adhesive affinity for the particular substrate to which it is bonded.

The substrates which form a part of the bonded, composite structures of the present invention can be any solid material to which the carbodiimide-containing polymers of the present invention will adhere when deposited thereon from solution and dried. As can be appreciated, the "solid material" may be, but need not be, adherent to the carbodiimide-containing polymer when the bonding material comprises an adhesive material interposed between the carbodiimide-containing polymer zone and the solid material. The present invention has particular utility when the substrate portion of the bonded, composite article is a polyester polymer or a corona-treated polyolefin.

The designation of a "substrate" and a "solid material" is arbitrary and for convenience in describing the composite structures herein. The terms "adhesive-receptive substrate" and "complementary adhesive" are used in the broad sense and are intended to refer to pairs of materials which inherently, in the solid form or as liquids (e.g. solutions or melts), possess an adhesive affinity for one another such that some physical force is required to separate the pairs of materials when they are intimately contacted which is over and above the force needed to overcome the forces of gravity and the forces used in deforming the materials themselves.

The bonded composite structures of the present invention can take many forms. Thus, sheet-like structures comprising a plurality of bonded sheets, films or layers of rigid, flexible, elastomeric or gelled materials is contemplated as well as structures comprising fibers or particles bonded to various substrates or bonded in various matrix materials. Thus, typical structures are adhesive tapes, wherein an adhesive material is bonded to a polymeric substrate, and various laminated structures wherein a polymeric film or coating is bonded to a polymeric or metallic (such as polyester, polyolefin, steel or aluminum) sheet-like substrate.

The thin polymer zone consisting essentially of the aforementioned carbodiimide-containing polymer which is included in the bonded structures of this invention is preferably applied to the substrate as a liquid solution or emulsion to form a thin zone of material and an adhesive or other material applied thereover in the solid or liquid form before or after drying the material in the polymer zone. Heat and/or pressure can be applied to improve the bond properties of the composite structures as will be described in greater detail hereinafter.

As has been previously described the bonded composite structures of the present invention include an improved bonding material which comprises a thin polymer zone consisting essentially of an organic polymer containing at least two carbodiimide groups and wherein each carbodiimide group is linked directly to an aromatic nucleus through a nitrogen atom in the carbodiimide group. The carbodiimide-containing polymers useful as bonding materials in the present invention must contain about 1 to about 35 percent by weight carbodiimide groups based on the total polymer weight. Preferably the polymer contains about 24 to about 31 weight percent carbodiimide groups and most preferably about 30 weight percent carbodiimide groups.

For convenience hereinafter the carbodiimide-containing polymers of the present invention will be referred to as polycarbodiimide polymers although, as will be described hereinafter, the polymers can contain substantial portions which do not contain a carbodiimide group. The portions of the polymer which are not carbodiimide groups can be any monovalent or bivalent organic radical, including monomers and polymers, and the selection of these portions of the polymer is not critical. The molecular weight of these radicals can vary within the range permitted by the required carbodiimide group concentration in the final polymer as previously described. Preferably the organic radicals in the polymer are free of substituents which react with isocyanate groups.

Preferably the polycarbodiimide polymers of the present invention are substantially soluble in organic solvents such as toluene, tetrahydrofuran, methylene chloride or the like to aid in the preferred method of applying the polycarbodiimide polymers to substrates from solution. However, the polycarbodiimide polymer in the completed, bonded structures can, when cured, be low molecular weight substantially soluble polymers or high molecular weight polymers or mixtures thereof.

A preferred class of polycarbodiimide polymers consists of carbodiimide groups linked by aromatic radicals wherein the polymers are oligomers having about 1 to 30, and most preferably about 10, repeating units and wherein the polymers are terminated with unreactive aromatic groups such as phenyl groups.

Polycarbodiimide polymers useful in the present invention can be conveniently prepared by known methods which comprise reacting organic diisocyanates in the presence of a carbodiimide-forming catalyst as 100% solids. These preparations are exemplified in U.S. Pat. No. 3,755,242, the disclosure of which is incorporated herein by reference.

Diisocyanates and monoisocyanate compounds can be coreacted in unreactive solvents and in the presence of a carbodiimide-forming catalyst to provide an end capped polycarbodiimide polymer which is useful as a bonding material in the present invention. These materials and procedures are exemplified in U.S. Pat. No. 3,450,562 and 3,862,989, the disclosures of which are incorporated herein by reference. The end capped polycarbodiimide polymers can also be prepared from 100% solids reactants by methods analogous to those disclosed in the aforementioned U.S. Pat. No. 3,755,242. Alternatively, end capped polycarbodiimide polymers can be prepared by replacing the aforementioned monoisocyanate with other monofunctional chain-terminating compounds which are reactive with isocyanates such as compounds having the structural formulae ROH, $RNH_2$, RNH-alkyl and RSH wherein R is a monovalent organic radical free of substituents which react with isocyanates. These procedures and materials are exemplified in U.S. Pat. No. 2,941,983.

The polycarbodiimide reactants can be admixed in unreactive organic solvent and the mixture refluxed at elevated temperature to complete the reaction, e.g. from 1 to 4 hours at 112° C, or admixed as 100% solids and allowed to react at room temperature for several days. When end capped polycarbodiimides are formed, the resulting liquid reaction product is stable for long periods of time and can be used when convenient without purification or extraction of the catalyst. The isocyanate terminated polycarbodiimides prepared by the reaction of diisocyanates are not as stable in solution and must be used within a few days to obtain the desired adhesive effects therefrom. Organic solutions of the end capped polycarbodiimides may also be formulated into stable aqueous emulsions by adding the solutions, with emulsifiers, to water.

Representative polycarbodiimide polymers can be conveniently represented by the structural formula $$R^1 + N=C=N-R^2\overline{)_a} N=C=N-R^3$$

wherein $a$ is at least one, $R^1$ and $R^3$ are monovalent organic radicals, preferably radicals free of substituents reactive with isocyanates, and $R^2$ is a monocyclic or polycyclic aromatic nucleus or an aryl terminated bivalent organic radical free of substituents which are reactive with isocyanates.

Representative groups included within the definition of $R^1$ and $R^2$ include aromatic radicals which may have aliphatic or other non-aromatic substituents thereon such as radicals having the structural formulae

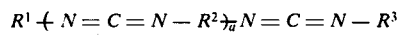

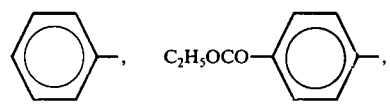

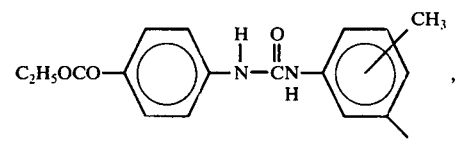

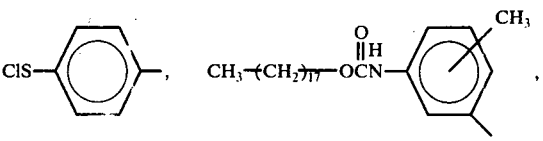

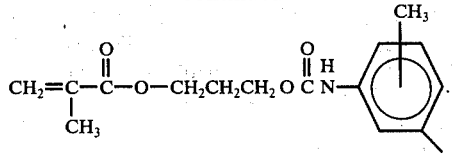

These radicals are conveniently derived from the corresponding isocyanates. Alternatively $R^1$ or $R^3$ can be a radical having the formula — $R^4$ NCO or —Ar NCO wherein $R^4$ is a divalent organic radical. As noted previously, methods for preparing the isocyanate terminated polymers are described in U.S. Pat. No. 3 755 242.

The aryl terminated bivalent organic radicals, $R^2$, can be aryl terminated polymeric radicals containing backbones comprising polyalkylene; polyether, such as the polyoxyalkylenes, e.g. polytetramethylene oxide, polyethylene oxide and polypropylene oxide; polyester (both regular and segmented) such as polycaprolactone, and polyolefin such as polybutadiene. These aryl terminated bivalent organic radicals are derived from isocyanate-terminated compounds which can be conveniently prepared by the reaction of two moles of an aromatic diisocyanate with about one mole of the isocyanate reactive backbone group such as an NCO, OH, SH, $NH_2$ or NH-alkyl terminated polymer.

Aromatic diisocyanates useful in preparing the polycarbodiimide polymers of the invention are the conventional aromatic diisocyanates, including mixtures thereof. Representative aromatic diisocyanates include 2,4-tolylene diisocyanate and 2,6-tolylene diisocyanate; 4,4'-methylene (di-p-phenylene) diisocyanate; 4,4'-diphenylene diisocyanate; m-phenylene diisocyanate; 1,5-naphthylene diisocyanate, durene diisocyanate, xylene diisocyanate, 1,3-naphthalene diisocyanate; 4,4'-oxy(di-p-2,2'-dichloro-4,4'-methylene (di-p-phennylene) diisocyanate; bis(4-isocyanatophenyl)sulfoxide.

Other preferred diisocyanates which can be used to prepare the polycarbodiimides of the present invention can be represented by the structural formula

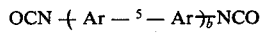

wherein $b$ is 0 or 1, Ar is an aromatic nucleus and $R^5$ is a bivalent organic radical free of substituents which react with isocyanates. As with $R^2$, the character of $R^5$ is not critical to the present invention and can be a polymeric chain comprising a backbone as described in connection with $R^2$ above. These diisocyanate compounds are available commercially or can be readily prepared by methods known in the art, such as by the reaction of aromatic diisocyanate, such as tolylene diisocyanate (TDI), with a difunctional, isocyanate-reactive organic group such as an NCO, OH, SH, $NH_2$ or NH alkyl terminated polymer or monomer.

The monoisocyanates and other monofunctional compounds useful in reacting with the diisocyanates and which act as chain stoppers in the polycarbodiimide-forming reaction can be any organic compound having a single group capable of reacting with isocyanate. The use of these monofunctional compounds allows the formation of controlled molecular weight polymers having selected capping groups. Thus, compounds having the structural formula $R^1$NCO or $R^1$XH are contemplated wherein $R^1$ is as previously defined and X is O, S, NH or N alkyl. Stearyl alcohol and phenyl isocyanate have been found to be particularly useful in the practice of the present invention.

A particularly preferred class of polycarbodiimide polymers useful in the present invention can be represented by the structural formula

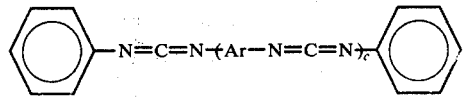

wherein $c$ is a number from 1 to about 30 and is preferably about 10 and A is an aromatic nucleus, preferably a toluene nucleus. These polycarbodiimide polymers are soluble in organic solvents such as toluene, tetrahydrofuran (THF) and methylene chloride and thus can be readily applied to various substrates from solutions or emulsions. The phenyl end caps render the compound stable in solution for long periods of time. These compounds have been used to particular advantage in the present invention by priming substrates such as poly(ethylene terephthalate) and corona treated polyolefins so that enhanced adhesion between the substrates and other solid materials is obtained.

In a preferred embodiment of the present invention, the bonded, composite structures described herein contain a thin polymer zone, up to about 500 Angstroms thick, which is the dried deposition product of a liquid solution or emulsion of the polycarbodiimide polymer. Liquid solutions of the polymer can be prepared by dissolving the polymer in an organic solvent such as toluene, THF, methylene chloride or the like at solids content of about 1% by weight or less, preferably about 0.05% by weight. These dilute compositions will provide the thin polymer zones required in the structures of the present invention. As noted previously, solutions of the polycarbodiimide polymers are stable for long periods of time if the polymers are not isocyanate terminated. The solutions of isocyanate terminated polymers tend to gel with age and should generally be used within a few days to achieve the optimum advantages therefrom.

When the non isocyanate terminated polymers are employed, the dilute organic solutions of the polymers can be further emulsified in water with the aid of conventional emulsifying agents.

When the liquid polycarbodiimide polymer composition has been applied to the substrate an additional solid material can be applied directly over the thin polymer zone. Thus, a pressure-sensitive or hot melt adhesive layer or a non adhesive polymeric resin, film or other solid material can be applied directly over the polymer zone and the composite structure dried to substantially remove the solvent from the polymer zone. Alternatively, the polymer zone can be dried after being applied to the substrate and the solid material subsequently applied over the polymer zone. When the polymer zone is dried prior to the application of the overlying solid material, the bonding properties of the materials are aided by activating the polymer zone with solvent and/or heat. For example, solvent containing resin or coating can be applied thereto or a solid polymeric film adhered to the polymer zone with the aid of heat and pressure. Typically, temperatures of about 100° C. are able to activate the dried polymer zone sufficiently so that satisfactory adhesion is obtained.

The polycarbodiimide polymers described herein can be advantageously employed as bonding materials for a variety of materials and structures. For example, the polymers can be used to improve the adhesion between a variety of sheet, film or fiber materials, which materials can be organic or inorganic and which can be flexible or rigid in nature. The polycarbodiimide polymers have proven particularly useful in preparing laminates or various synthetic polymeric sheets or films. Moreover, the polycarbodiimide polymers have been used to improve the adhesion of various coatings and particles to a variety of substrates.

A particularly useful application of the polycarbodiimide polymers relates to composite structures wherein the substrate is a polyester film or fiber, particularly a poly(ethylene terephthalate) substrate. The improvement in bonding can be demonstrated by improved peel adhesion and/or improved resistance to various environments.

EXAMPLE 1

A phenyl terminated polycarbodiimide polymer having about 10 carbodiimide groups in each polymer molecule was prepared as follows: To a 3-necked flask equipped with an agitator and a condenser with a drying tube were added 87 g. toluene diisocyanate (80:20 2,4:2,6 isomeric mixture) (1.0 eq.), 11.9 g. phenyl isocyanate (0.1 eq.) 500 g. toluene, and 2.0 g. of a 50% methylene chloride solution of 1-phenyl-3-methylphospholene oxide. The solution was refluxed at about 112° C. for about four hours and allowed to cool to room temperature. Infrared analysis revealed no absorption due to isocyanate and a very strong band at 4.8 microns due to carbodiimide. Gel permeation chromatographic analysis of the reaction mixture indicated a number average molecular weight of about 1460 and a weight average molecular weight of about 8400.

The reaction mixture was dissolved in an 85:15 toluene/isopropanol mixture at a solids concentration of about 0.05 g/100 ml of solution. The solution was coated onto a 4.5 mil photo grade poly(ethylene terephthalate) film using a 200 line/inch gravure roll. The solvent was removed from the coating solution by drying in air at about 150° F. The coated polyester film was rolled up and stored at room temperature. The polycarbodiimide coated film was used to make a variety of bonded, composite structures and retained its adhesion properties for at least 2 months.

EXAMPLE 2

Polycarbodiimide polymers having the structural formula

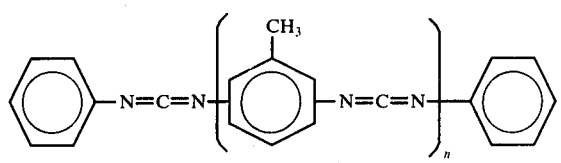

wherein $n$ ranged from about 0 to about 20 were prepared by the general procedure of Example 1 except that the carbodiimide where $n = 0$ was prepared by the procedure described in "Organic Synthesis," 43, 31.

The polycarbodiimide products were diluted to about 5% solids in toluene and applied to 4.5 mil photo grade poly(ethylene terephthalate) film using a 2-roll coater. A layer of isooctyl acrylate/acrylic acid adhesive (U.S. Pat. No. Re. 24,906) was placed on the primed surface followed by curing at 200° F. for 4 minutes. A flexible sheet material was then adhered to the acrylic adhesive and the resulting composite structures were evaluated by pelling the flexible sheet material at 180° from the polyester substrate at a constant rate. The results are shown in Table I below.

TABLE I

| "n" value of Polymer | Peel force, oz/½" width | % Transfer of Acrylic Adhesive to sheet Material |
| --- | --- | --- |
| 0 | 37 | 100 |
| 1 | 58 | 0 |
| 3 | 58 | 0 |
| 5 | 56 | 0 |
| 10 | 58 | 0 |
| 15 | 56 | 0 |
| 20 | 56 | 0 |
| Control (Unprimed polyester) | 35 | 100 |

EXAMPLE 3

Strips of the polycarbodiimide coated polyester film prepared in Example 1 were coated on the polycarbodiimide primed side with a toluene solution of styrene/butadiene block copolymer (cured at 200° F. for 4 minutes) and a polyurethane latex pressure sensitive adhesive (described in U.S. Pat. No. 3 796 678) followed by curing at 200° F. for 4 minutes.

A flexible sheet material was firmly adhered to the coating and peeled at 180° at a constant rate. The peel force for the styrene/butadiene block copolymer coated construction was 108 oz/½ inch with 0% adhesive transfer. The peel force for the structure containing the polyurethane adhesive was 52 oz/½ inch width with 0% transfer, while an unprimed control had a peel value of 42 oz/½ inch width with 100% transfer.

EXAMPLE 4

Polyethylene and polypropylene films (one side corona treated) were primed with a toluene solution of the phenyl terminated polycarbodiimide polymer described in Example 1. Following air drying to remove the solvent, the primed films were knife-coated with a 3 mil toluene/ethyl acetate solution of isooctyl acrylate/acrylic acid adhesive. The solvent was removed by allowing the films to dry over night at room temperature. An adhesive sheet was adhered to the acrylate surface and peeled from the substrate at 180° at a constant rate. The peel force is shown in Table II below.

TABLE II

| Substrate | Corona Treated | Polycarbodiimide Primed | Adhesion Force oz/½" width | % Transfer |
| --- | --- | --- | --- | --- |
| Polyethylene | none | none | 6 | 100 |
| | Yes | none | 38 | 75 |
| | none | Yes | 4 | 100 |
| | Yes | Yes | 38 | 0 |
| Polypropylene | none | none | 8 | 100 |
| | Yes | none | 34 | 100 |
| | none | Yes | 8 | 100 |
| | Yes | Yes | 38 | 0 |

EXAMPLE 5

A coextruded, 3 mil polyester film [0.1 mil 20:80 poly(ethylene iso:terephthalate) and 2.9 mil of poly(ethylene terephthalate)] was primed on the copolyester side by squeeze rolling a 5% solution of isocyanato-terminated polycarbodiimide (U.S. Pat. No. 3,755,242, Example 3) in dichloromethane. "Versalon" TPX-322 (General Mills), a thermoplastic polyamide, was almost immediately knife coated (20 mil wet orifice) over the primed surfaces from a 25% solids solution of isopropanol:toluene (2:1). The spreads were then dried and cured at 225°-230° F. for 10 minutes. Test strips were than heat bonded at 250° F. and 300 psi for ten seconds to an aluminum test panel which had a vinyl coating. The control spread (no primer) backing parted from the adhesive and exhibited 100% transfer to the test panel. The primed sample could not be peeled from the metal without breaking of the polyester backing. The failure was always either clean adhesive failure or cohesive failure.

EXAMPLE 6

Phenyl terminated polycarbodiimide polymer having a polybutadiene backbone was prepared as follows: To a flash equipped with a magnetic stirrer and a condenser with a drying tube were added 28.0 g. (0.02 eq.) polybutadiene glycol (Poly Bd R-45M from Arco Chem.; molecular weight 2800), 3.48 g. (0.04 eq.) toluene diisocyanate (80:20 2,4:2,6 isomeric mixture), and 97 g. toluene. The resulting solution was refluxed (112° C.) for three hours and allowed to cool to room temperature. Phenyl isocyanate (2.38 g.; 0.02 eq.) and 0.66 g. of a 50% methylene chloride solution of 1-phenyl-3-methylphospholene oxide were added and the resulting solution was refluxed for six hours. Infrared analysis of the cooled solution revealed no absorption due to isocyanate and a strong absorption at 4.8 $\mu$ due to carbodiimide.

The above reaction mixture was diluted to 5% solids with toluene and primed onto 1.5 mil photo grade poly(ethylene terephthalate) film using a 2-roll coater.

A layer of isooctyl acrylate/acrylic acid adhesive was placed on the primed surface followed by curing at 200° F. for 4 minutes. A flexible sheet material was adhered to the acrylic adhesive and the resulting composite structure was evaluated by peeling the flexible sheet material at 180° from the polyester substrate at a constant rate. The resulting constructions exhibited a peel adhesion of 58 oz/½ inch width with 0% adhesive transfer. An unprimed control exhibited a peel adhesion of 33 oz/½ inch width with 100% adhesive transfer to the flexible sheet material.

EXAMPLE 7

Phenyl terminated polycarbodiimide oligomers with poly(ethylene oxide) backbone were prepared as follows:

Carbowax 4000 Backbone — To a flask equipped with a magnetic stirrer and a condenser with a drying tube were charged 40 g. (0.02 eq.) poly(ethylene oxide) glycol (M.W. 4000) (Carbowax 4000 from Union Carbide) and 230 g. toluene. After gentle warming to complete the solution, 3.48 g. (0.04 eq.) toluene diisocyanate (80:20 2,4:2,6 isomeric mixture) was added and the solution refluxed (112° C.) for 3 hours. The reaction mass was allowed to cool to room temperature and 2.38 g. (0.02 eq.) phenyl isocyanate and 0.1 g. of a 50% methylene chloride solution of 1-phenyl-3-methylphospholene oxide were added. The solution was refluxed (112° C.) for 4 hours and allowed to cool to room temperature.

Carbowax 6000 Backbone — The above procedure was repeated except that the Carbowax 4000 was replaced with 60 g. (0.02 eq.) poly(ethylene oxide) glycol (M.W. 6000) (Carbowax 6000 from Union Carbide).

The above two reaction masses were diluted with toluene to about 5% solids and applied to 1.5 mil poly (ethylene terephthalate) film using a 2-roll coater. A layer of isooctyl arcylate/acrylic acid adhesive was applied to the primed film followed by drying at 200° F. for 4 minutes. The resulting constructions were evaluated using a peel test similar to that of Example 2 with the results shown in Table III.

TABLE III

| Polycarbodiimide Primer | Weight % Carbodiimide in polymer | Peel Adhesion, oz/½" width | % Adhesive Transfer |
|---|---|---|---|
| None | — | 33 | 100 |
| Carbowax 4000 Backbone | 1.78 | 55 | 50 |
| Carbowax 6000 Backbone | 1.23 | 55 | 100 |

EXAMPLE 8

Ethyl-p-Benzoate Terminated Polycarbodiimide

Polymer was prepared as follows: To a flask equipped with a magnetic stirrer and a condenser with a drying tube were charged 19.1 g. ethyl-p-isocyanatobenzoate (0.1 eq.), 87 g. toluene diisocyanate (1.0 eq.) (80:20 2,4:2,6 isomeric mixture), 2 g. of 50% methylene chloride solution of 1-phenyl-3-methylphospholene oxide, and 300 ml. tetrahydrofuran (THF). The solution was refluxed four hours and cooled to room temperature. The reaction mixture was diluted to about 5% solids with THF and coated onto poly (ethylene terephthalate) film using a 2-roll coater. A layer of isooctyl acrylate/acrylic acid adhesive was applied followed by curing at 200° F. for 4 minutes. A peel test similar to that of Example 2 provided a peel adhesion of 66 oz./½ inch width with less than 25% adhesive transfer.

EXAMPLE 9

A phenyl terminated polycarbodiimide polymer using methylene polyphenyl isocyanate was prepared as follows: To a 3-necked flask equipped with an agitator and a condenser with a drying tube were added 12.5 g. Isonate 143L (Upjohn, 0.1 eq.), 1.19 g. phenyl isocyanate (0.01 eq.), 133 g. toluene, and 0.2 g. of a 50% methylene chloride solution of 1-phenyl-3-methylphospholene oxide. The solution was refluxed for 4 hours and allowed to cool to room temperature. Filtration removed a slight quantity of precipitate which infrared analysis indicated was a polycarbodiimide containing isocyanurate linkages. Infrared analysis of the supernatant liquid revealed a very strong doublet centered at 4.8 microns with a shoulder at 4.9 microns due to carbodiimide. No isocyanate or isocyanurate absorption were observed.

The supernatant toluene solution was diluted with toluene to 5% solids and coated onto polyester film with a 2-roll coater. A layer of isooctyl acrylate/acrylic acid adhesive was applied and cured at 200° F for 4 minutes. A peel test similar to that of Example 2 provided a peel adhesion of 56 oz/½ inch width with 0% transfer of the acrylate adhesive.

EXAMPLE 10

Toluene solutions having varying concentrations of the phenyl terminated polycarbodiimide polymer prepared in Example 1 were coated onto poly(ethyleneterephthalate) film using a 200 line/inch gravure roll. Following drying to remove the solvent a layer of isooctyl acrylate/acrylic acid adhesive was applied to the primed film followed by curing at 200° F for 4 minutes. A peel test similar to that described in Example 2 provided the following results.

TABLE IV

| Primer Concentration g/100 ml | Peel Adhesion oz/¼" width | % Transfer |
|---|---|---|
| 5 | very low | 100 |
| 0.5 | 54 | 0 |
| 0.05* | 60 | <2 |
| 0.005 | 48 | 100 |
| 0.01 | 44 | 100 |

*Dried primer film less than 30 Angstroms thick.

EXAMPLE 11

A 5% toluene solution of phenyl terminated polycarbodiimide polymer like that prepared in Example 1 was squeeze rolled into 500 denier filament polyester fabric (Celanese style 12853). The fabric was allowed to air dry and then back-sized with a mixture of phenolic, Versamid, cellosolve, dicalite and calcium carbonate. Following curing a make coat of a phenolic resin, calcium carbonate, and aluminum oxide was applied. Following curing an additional coating of phenolic resin and calcium carbonate was applied. The stripback adhesion of the make coat was determined using an Instron. The stripback adhesion value was 3.85 lb./in. for the primed fabric versus 1.54 lb./in. for an unprimed control.

EXAMPLE 12

A sample of the polycarbodiimide primed polyester film of Example 1 was coated with a 0.6 mil layer of unfilled, water dilutable novolak phenol-formaldehyde phenolic resin. The adhesion was tested using a qualitative flexing test. The adhesive bond to the film was found to be greater than the cohesive strength of the film.

We claim:

1. A bonded, composite structure comprising at least one polymeric substrate selected from the group consisting of polyester polymers and polyolefin polymers, said substrate having a solid material adhered thereto by an interposed bonding material which is a thin polymer zone having a thickness of up to about 500 Angstroms and consisting essentially of an organic polycarbodiimide polymer containing at least two carbodiimide groups, each linked directly to an aromatic nucleus through a carbodiimide nitrogen, said polycarbodiimide polymer containing about 1 to 35 weight percent carbodiimide groups.

2. A composite structure according to claim 1 wherein said polycarbodiimide polymer is free of substituents which will react with isocyanate groups.

3. A composite structure according to claim 1 wherein said polycarbodiimide polymer is a phenyl end-capped polymer.

4. A composite structure according to claim 1 wherein said solid material is an adhesive material.

5. A composite structure according to claim 4 wherein said adhesive material is a pressure-sensitive adhesive and wherein said polyester polymer is a poly(ethylene terephthalate) polymer.

6. A composite structure according to claim 5 wherein said pressure-sensitive adhesive is an acrylate adhesive.

7. A composite structure according to claim 6 wherein said acrylate adhesive is an isooctyl acrylate/acrylic acid adhesive.

8. A composite structure according to claim 4 wherein said adhesive material is a pressure-sensitive styrene/butadiene block copolymer adhesive.

9. A composite structure according to claim 4 wherein said adhesive material is a thermoplastic adhesive.

10. A composite structure according to claim 4 wherein said adhesive material is a water-based phenolic thermoset resin.

11. A composite structure according to claim 1 wherein said substrate is a corona treated polyolefin polymer substrate.

12. A composite structure according to claim 3 wherein said substrate is a flexible polyester sheet having on one major surface thereof an adhered solid material which is an isooctyl acrylate/acrylic acid pressure-sensitive adhesive.

* * * * *